(12) United States Patent
Bowser

(10) Patent No.: US 6,870,570 B1
(45) Date of Patent: Mar. 22, 2005

(54) TELEVISION RECEIVER WITH SHARED DATA PORT AND CONTROL SOFTWARE

(75) Inventor: Todd S. Bowser, Yardley, PA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 501 days.

(21) Appl. No.: 09/702,229

(22) Filed: Oct. 31, 2000

(51) Int. Cl.⁷ ................................................ H04N 7/00
(52) U.S. Cl. .................... 348/552; 725/80; 725/141; 725/153; 348/460
(58) Field of Search ............................ 348/552, 553, 348/734, 460; 725/80, 133, 141, 153

(56) References Cited

U.S. PATENT DOCUMENTS

| | | | | |
|---|---|---|---|---|
| 4,694,490 A | * | 9/1987 | Harvey et al. ................ 380/20 |
| 5,010,499 A | * | 4/1991 | Yee ............................ 348/552 |
| 5,537,151 A | * | 7/1996 | Orr et al. .................... 348/564 |
| 5,604,542 A | * | 2/1997 | Dedrick ....................... 348/552 |
| 5,619,337 A | | 4/1997 | Naimpally |
| 5,973,625 A | | 10/1999 | Nam |
| 5,978,013 A | * | 11/1999 | Jones et al. .................. 725/23 |
| 5,982,445 A | * | 11/1999 | Eyer et al. ................... 348/461 |
| 6,052,556 A | | 4/2000 | Sampsell |
| 6,064,438 A | * | 5/2000 | Miller ........................ 348/465 |
| 6,311,243 B1 | * | 10/2001 | Hamamoto et al. ......... 710/107 |
| 6,433,831 B1 | * | 8/2002 | Dinwiddie et al. ......... 348/553 |
| 6,437,830 B1 | * | 8/2002 | Horlander ................... 348/478 |
| 6,438,319 B1 | * | 8/2002 | Inoue et al. ................. 386/116 |
| 6,477,705 B1 | * | 11/2002 | Yuen et al. ................... 725/41 |
| 6,493,874 B2 | * | 12/2002 | Humpleman .................. 725/78 |
| 2002/0056088 A1 | * | 5/2002 | Silva et al. .................. 725/9 |
| 2002/0056112 A1 | * | 5/2002 | Dureau et al. ................ 725/78 |
| 2002/0057893 A1 | * | 5/2002 | Wood et al. .................. 386/46 |

OTHER PUBLICATIONS www.bluetooth.com.
Specification of Software Connection: InfraRed: Communications from www.palm.com.

* cited by examiner

Primary Examiner—Victor R. Kostak
(74) Attorney, Agent, or Firm—RatnerPrestia

(57) ABSTRACT

A system for transferring data from a television receiver to a display device and a shared data device includes a digital television receiver, a display device, at least one shared data device, and a communications channel coupled to the television receiver and the shared data devices. The television receiver receives, decodes, and processes a digitally encoded television signal (e.g., MPEG). This processed signal is provided to a display device (e.g., television monitor). In addition, an auxiliary data signal, sent with the digitally encoded television signal, is sent to at least one shared data device. Each of the shared data devices may be a printer, another television receiver, a digital video tape recorder, or a personal digital assistant (PDA). With a system as described herein, the auxiliary data may be an electronic program guide such that a viewer may print a program menu for subsequent review. Upon reviewing the printed program menu, the viewer may then select a channel for viewing or program a video tape recorder to record a selected channel. Alternatively, a viewer may transfer the electronic program guide to a PDA, review the program menu on the PDA, and subsequently program the television receiver, via the PDA, to select a channel for viewing or program a video tape recorder, via the PDA, to record a selected channel.

16 Claims, 3 Drawing Sheets

TELEVISION RECEIVER WITH SHARED DATA PORT AND CONTROL SOFTWARE

FIELD OF THE INVENTION

The present invention relates to a method and apparatus for transferring data, and specifically to transferring auxiliary data from a television receiver to a shared data device.

BACKGROUND OF THE INVENTION

The number of television programs that a viewer may receive at any given time has increased geometrically in the last few years. Conventional analog television systems such as those conforming to the National Television Standards Committee (NTSC) and Phase Alternate Line (PAL) standards transmit one program per 6 MHz or 8 MHz channel. Recently, digital television signal processing techniques have been developed that allow multiple programs to be transmitted in each 6 MHz channel. Furthermore, there are now many sources of television signals. In addition to the conventional broadcast antenna, a viewer may receive television signals via wired cable systems, several different types of satellite systems, so-called wireless cable systems and, in the near future, via a global information network, such as the Internet.

Conventional cable television systems are capable of delivering at least 140 six MHz channels and some systems are capable of delivering over 200 channels via a coaxial cable. Presently, new technology is being investigated to increase the number of programs that can be delivered to the home. This is being done via two technologically strategic moves. The first is to increase the allocated bandwidth to one GHz (which provides for 150, six MHz channels). The second is to use video compression to configure a channel to carry up to ten minor channels in one six MHz channel. Channels that include a plurality of minor channels are also known as multiprogram channels. Typical numbers that are used in the industry estimate that about 500 programs can be delivered to the home over a single coaxial cable. Fiber optic cable provides many times the bandwidth of a coaxial cable and promises to be able to provide several thousand programs. In the same way, increased bandwidth for satellite systems may allow a viewer to receive upwards of one-thousand six MHz channels, each channel containing up to ten minor channels.

It is difficult, however, for a viewer to sort through this large number of programs. Problems are already being felt by subscribers who search through 140 programs, much less 500 or 1000. To address this problem, many of the newer television systems have on-screen menus that present the program selections organized by type. One such system uses a dedicated channel to display program schedule information. To view the information, the viewer tunes to the dedicated channel. The advantage of such a system is that it is relatively easy to deploy because it is centrally implemented at the transmission head-end. No additional electronics or software is required at the viewer location because full control of the display is maintained at the transmission head-end. The display information is then broadcast continuously on a dedicated channel. The television viewer tunes the cable converter box or television tuner to the channel on which the schedule information is displayed to view the program listings. Typically, these program guides utilize a scrolling display of television listings. Some systems employ a partial screen of listings with additional information in the remainder of the screen such as adver tisements for movies on pay channels, pay-per-view event schedules, time and weather information, and other commercial information. These systems generally incorporate a grid or matrix to display the program schedule information, with a different row for each channel and columns representing different time slots.

Another type of electronic program guide uses software and/or hardware in the viewer's receiver to retrieve and process a television schedule database that is transmitted during a portion of a television channel (e.g. the vertical blanking interval). One such system is the Starsight™ service. A television receiver equipped to use the Starsight service periodically tunes to a guide channel, even when the receiver is turned off, to recover a schedule information database that is encoded in the vertical blanking interval of the television signal that is broadcast on the guide channel. The system then formats the data so that it may be displayed to the viewer as a hierarchical set of on-screen menus. These menus allow the user some flexibility in determining how the data is displayed. For example, program data may be displayed by type of program (e.g. sports, drama, comedy). Alternatively the viewer may select only a few favorite channels for which data are displayed.

Even with this amount of interaction, existing electronic program guide (EPG) systems may be frustrating for a viewer, especially one who has access to a large number of channels, because only a relatively small number (e.g. 10) can be viewed at any one time. If, for example, a viewer is connected to a fiber optic cable system or to a combination of a broadcast antenna, satellite dish and cable system and can receive 500 to 1000 programs, 50 to 100 screens would be needed to display all of the possible options. In addition, existing EPG systems are still somewhat difficult to use and lack features that may make them aesthetically pleasing. These deficiencies contribute to their limited use by viewers and general preference for printed television schedules.

Effective menu systems, however, are a requirement in the age of digital television. Due, in part, to the compression techniques used to squeeze up to ten standard definition television (SDTV) programs into one six MHz channel, switching among channels takes much more time on a digital receiver than on an analog receiver. It may take, for example, three or four seconds between the time the viewer selects a new program and the time any image information for that program is displayed on the receiver.

In addition, many viewers may find a continuously scrolling program guide difficult to read because their eyes must follow the listings as they move up the screen. Compounding this problem is the tendency to use scrolling listings in a split screen format together with advertisements, promotional information and other information. It may be frustrating for viewers to be forced to continuously view this information while they are waiting for the schedule information for a desired channel to appear on the display.

Another possible reason why electronic program guides are underutilized is they simply are boring to watch. While a full screen of listings allows for the display of more schedule information at one time and thus a shorter cycle time through the entire program schedule, viewers could be bored by the monotony of continuously viewing a full screen of listings. As indicated above, however, split screen program guides that simultaneously display additional information of possible interest to the viewer have the disadvantage of much longer cycle times.

Furthermore, as people's schedules become more complex, viewers become frustrated viewing a program guide rather than viewing a program. This problem is not easily overcome because not all transmission stations provide printed program guides, which can be reviewed in advance. Accordingly, there exists a need for an improved technique of providing program information in order to make program scheduling more convenient.

SUMMARY OF THE INVENTION

The present invention provides a system and method for transferring auxiliary data from a television receiver to a display device and at least one shared data device. The auxiliary data represents data in addition to the audio and video portions of a television program. It is transferred via a communications medium coupled to the shared data device and the television receiver. In alternate embodiments of the invention, the shared data device may be a printer, another television receiver, a digital video tape recorder, or a personal digital assistant (PDA).

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
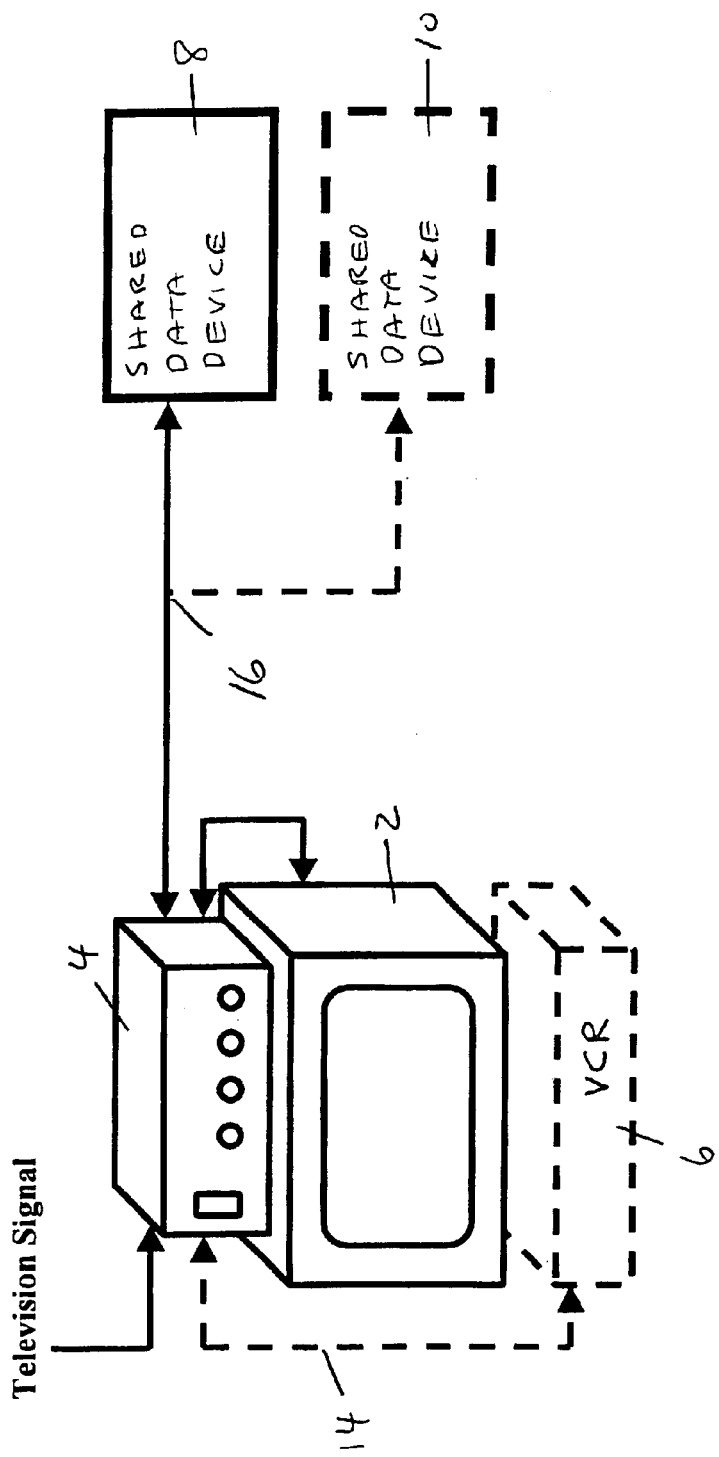
FIG. 1 is a block diagram of a television receiver configured in accordance with an exemplary embodiment of the invention.

FIG. 1 is a block diagram of a television receiver configured in accordance with an exemplary system configuration of the present invention. The system depicted in FIG. 1 comprises a television receiver 4, a video display device 2, an optional video cassette recorder (VCR) 6, a first shared data device 8, and an optional second shared data device 10. In this system configuration, the television receiver 4, which, in the exemplary embodiment of the invention, is a set-top box (STB), is coupled to display video information on a video display device 2. The STB 4 is also coupled to provide information to and receive information from a VCR 6. In an exemplary embodiment of the invention, STB 4 is coupled to provide an Digital VHS (D-VHS) transport stream, and to receive an D-VHS transport stream from a digital VCR 6.

Referring to FIG. 1, in alternate embodiments of the invention, a television signal is provided to STB 4 by a satellite, antenna, or cable transmission system. The VCR 6 is coupled to the STB 4 via communications channel 14. Communications channel 14 may take the form of various interfaces (e.g., audio and video cables, coaxial cable, or an IEEE 1394 bus). Shared data device 8 and optional shared data device 10 are not limited to, but may be any combination of, a printer, a personal digital assistant (PDA), another STB, or another video display device. Communications channel 16 is not limited to a specific type of interface. For example, communications channel 16 may be a serial printer interface, a parallel printer interface, a radio frequency (RF) interface (e.g. Bluetooth), an infrared (IR) interface, or a Universal Serial Bus (USB) interface. If the shared device is a PDA, then the communications channel may be a radio-frequency or an infrared interface and the PDA, using the infrared interface, may also function as a remote control device for one or more of the STB 4, display device 2 or VCR 6.

In operation, the exemplary system depicted in FIG. 1 receives a television signal at STB 4. The television signal is decoded and processed to provide data to display device 2. STB 4 also provides auxiliary data such as an EPG or user data embedded in the television signal to shared data devices coupled to communications channel 16. For example, STB 4 may provide program guide data to shared data device 8, which may be a printer, and/or to shared data device 10, which may be a PDA. In this example, a viewer has the advantage of reviewing the printed program guide at his or her leisure, and, if the shared device is a PDA, of searching the database, as stored in the PDA, for a program of interest. Using the shared device, the viewer is not required to sit in front of the television while selecting programs. After the viewer selects programs to be viewed, the viewer may, for example, either view the selected programs or: cause the VCR 6 to record the selected programs. Another alternative available to the viewer in this example is reviewing the program guide on the PDA and programming the VCR 6 to record selected programs via the PDA. Still another example is to provide the program guide to the VCR 6 as a shared data device and then using the stored program guide in the VCR 6 to record a desired program.

Figure 2:
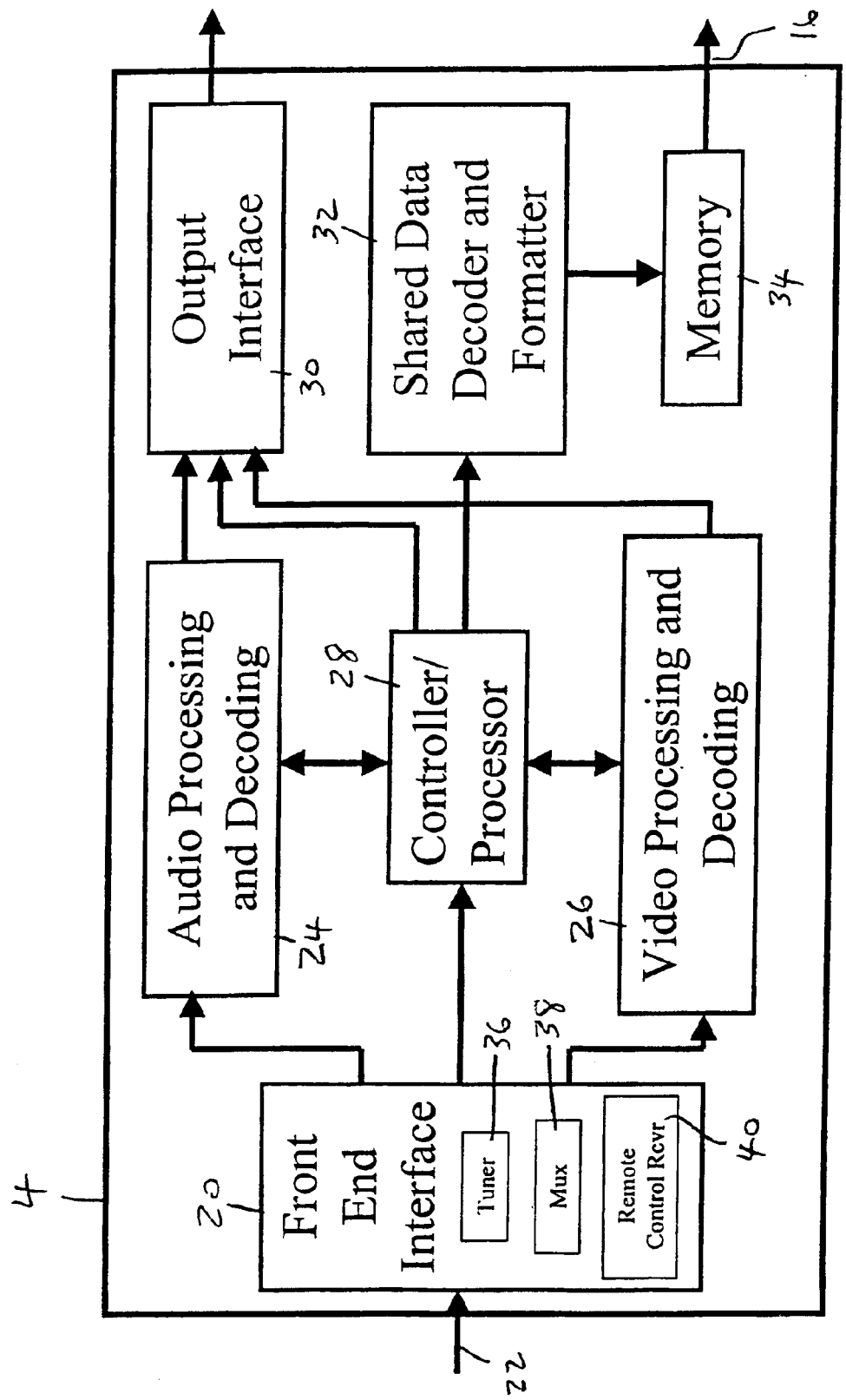
FIG. 2 is a block diagram of an exemplary embodiment of a set top box having a shared data decoder and formatter for providing data to a shared data device.

FIG. 2 is a block diagram depicting a STB having a shared data decoder and formatter for providing data to a shared data device. STB 4 in FIG. 2 comprises a front end interface 20, an audio processing and decoding portion 24, a video processing and decoding portion 26, a controller/processor portion 28, an output interface 30, a shared data decoder and formatter portion 32, and buffer memory 34.

In FIG. 2, a television signal is provided to the front end interface 20 via communications channel 22. The source of this television signal may be any combination of several systems (e.g., D-VHS, satellite, antenna, or cable transmission system). Front end interface 20 may include, for example, a tuning portion, a multiplexing portion, and a command receiving portion. For the sake of clarity, internal connections are not shown for front end interface 20. Tuner 36 and multiplexer 38 provide tuning and routing for the television signals provided by communications channel 22. Command receiver 40 receives signals from, for example, an infrared (IR) remote control device (not shown) or a control panel on the television receiver. One item that is controlled by the command receiver 40 is what data is provided to the shared data device 8. For example, if the shared data device 8 is a printer, the control panel may contain a print key to allow a viewer to print a copy of the electronic program guide (EPG) that is provided with the television signal. It is envisioned that a viewer may print a program guide regardless of whether the program guide is being viewed on a display device. Alternatively, the system may be configured to transfer only individual screens of data from the television receiver to the printer so that a viewer would display the EPG as successive screens formatted by the on-screen display (OSD) processor (not shown) of the television receiver 4 and print out several screens to obtain a desired part of the EPG. In another example, a remote control device may contain a key allowing a viewer to transfer the program guide to a PDA. If the PDA has an IR interface, the EPG data may be transferred to the PDA using the IR interface or an RF interface and the PDA, itself may be the remote control device.

The exemplary audio processing and decoding block 24, video processing and decoding block 26 and the controller/processor 28 decode MPEG encoded video signals. The MPEG standard is actually several different standards. In MPEG, several different profiles are defined, each corresponding to a different level of complexity of the encoded image. For each profile, different levels are defined, each level corresponding to a different image resolution. One of the MPEG standards, known as Main Profile, Main Level is intended for coding video signals conforming to existing television standards (i.e., NTSC and PAL). Another standard, known as Main Profile, High Level, is intended for coding high-definition television images. Images encoded according to the Main Profile, High Level standard may as many as 1,152 lines per image frame and 1,920 pixels per line. While the invention is described in terms of a television receiver that receives MPEG encoded signals, it is generally applicable to other MPEG formats such as MPEG-1 and MPEG-4. In addition, it is applicable to other video transmission standards that include digital data with the video information. In the materials that follow, these are generally referred to as MPEG even though they may not conform to any standard adopted or proposed by the Moving Pictures Experts Group.

The MPEG standard defines a complex syntax which contains a mixture of data and control information. Some of this control information is used to enable signals having several different formats to be covered by the standard. These formats define images having differing numbers of picture elements (pixels) per line, differing numbers of lines per frame or field, and differing numbers of frames or fields per second. In addition, the basic syntax of the MPEG Main Profile defines the compressed MPEG bit stream representing a sequence of images in five layers, the sequence layer, the group of pictures layer, the picture layer, the slice layer and the macroblock layer. Each of these layers is introduced with control information. Finally, other control information, also known as side information, (e.g. frame type, macroblock pattern, image motion vectors, coefficient zigzag patterns and dequantization information) is interspersed throughout the encoded bit stream. Also interspersed throughout the encoded bit stream are various USER DATA fields.

In the exemplary block diagram shown in FIG. 2, front end interface 20 provides data to audio processing and decoding portion 24, controller/processor 28, and video processing and decoding portion 26. In an exemplary embodiment of the invention, video processing and decoding portion 26 decodes conventional digital television signals that have been encoded according to the MPEG standard and in particular, the Main Profile High Level (MP@HL) and the Main Profile Main Level (MP@ML) MPEG standards. Video processing and decoding portion 26 includes an on-screen display (OSD) processor (not shown), which may be used, for example, to generate control menus, to provide information on the status of the set-top box, or to provide closed caption information or other formatted data to output interface 30. The OSD processor may also be used to either partially format or fully format the data that is sent to the shared data device 8.

Audio processing and decoding portion 24 processes the MPEG signals provided by front end interface 20 and controller/processor 28. Audio processing and decoding portion 24 generates audio signal components from encoded digital information and provides audio signal components to output interface 30. Decoders of this type are well known in the art.

Controller/processor 28 controls the timing and sequencing of audio processing and decoding portion 24 and video processing and decoding portion 26. Control/processor 28 also provides data to output interface 30 and shared data decoder and formatter 32. This data may be extracted from a data program in an MPEG multi-program bit-stream or it may be extracted from one or more user data fields embedded in the MPEG bit-stream. When a viewer elects to transfer data to a shared data device (e.g., to print a program guide), display data is provided by controller/processor 28 to shared data decoder and formatter 32. Shared data decoder and formatter 32 formats the data in a form compatible with a particular shared data device and then provides the formatted data to the shared data device via buffer memory 34. Buffer memory 34 stores data to be transferred to the shared data device. This memory allows the shared data decoder and formatter 32 to receive and process data received from controller/processor 28 in a burst while allowing the data to be provided to the shared data device at a controlled data rate. Data is transferred to the shared data devices via communications channel 16. As previously described, communications channel 16 may be a serial or parallel printer interface, an RF interface, IR interface, a universal serial bus or other communications bus.

Figure 3:
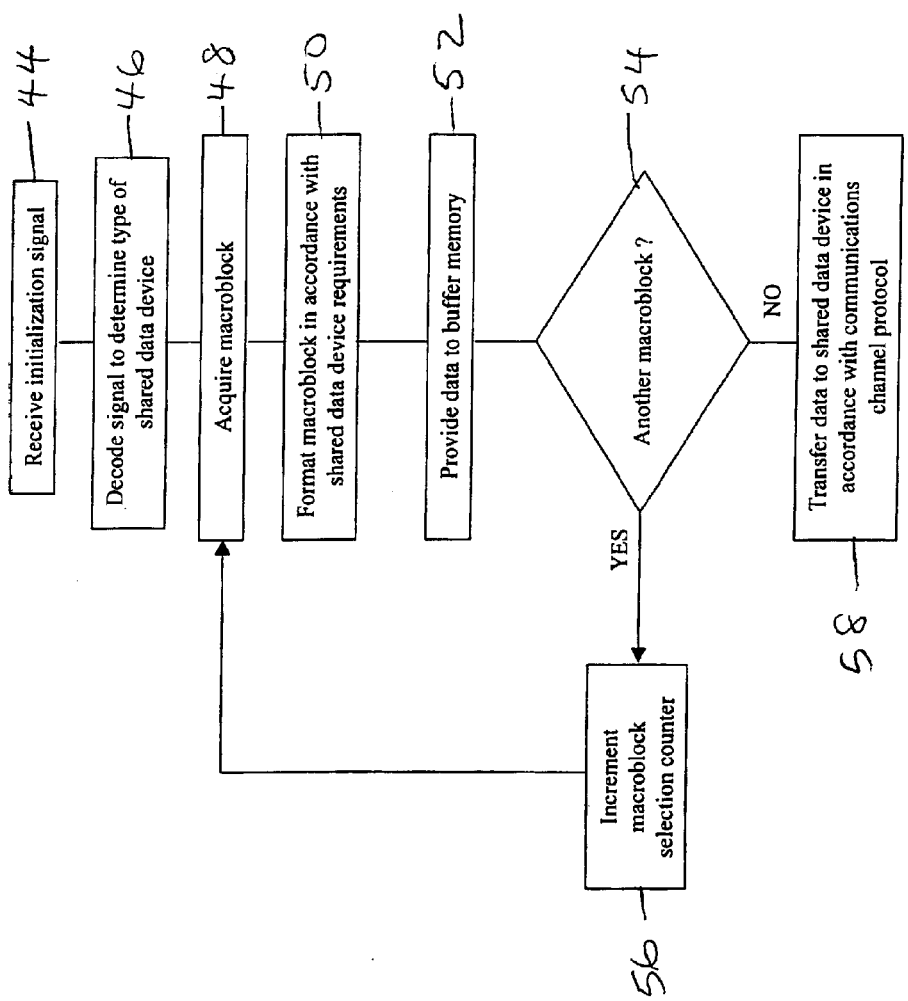
FIG. 3 is a flow diagram depicting an exemplary method for transferring data from a set top box to a shared data device.

FIG. 3 is a flow diagram illustrating an exemplary method for transferring data to a shared data device. The exemplary method depicted in FIG. 3 is a method for printing a program guide or transferring a program guide or other data, such as close-caption data, to a PDA. Other embodiments and methods are envisioned, and this description is not intended to limit the scope of the invention to only these examples. In this exemplary method, a viewer elects to print a program guide (e.g., via a remote control device). The signal is received by remote control receiver 40, and serves as the initialization signal for the print process. Shared data decoder and formatter 32 ultimately receives the initialization signal as shown in step 44, which starts the transfer process.

In step 46, upon receipt of the initialization signal, shared data decoder and formatter 32 decodes the signal to determine the type of shared data device (e.g., printer, PDA, STB, or display device) that is to receive data. As previously described, examples requests include a viewer selecting to print a program guide, or to transfer a program guide to a PDA. These requests are encoded such that the shared data decoder and formatter 32 can direct the data to a particular type of shared data device.

According to step 48, a page of data is acquired. A page of data may represent, for example, a single display of data that is viewed on the display device. In this process, a page selection counter (not shown) is utilized to determine which page to acquire. Thus, in this example, the counter indicates that the first page of data is to be captured. It is not envisioned that the page selection counter must be a counter, but may be any selection means, which is well known in the art (e.g., value in memory, dedicated register, counter).

Once the page of data is acquired (i.e., transferred from controller/processor 28 to shared data decoder and formatter 32), shared data decoder and formatter 32 formats the data in accordance with the requirements or the selected shared data device, as indicated in step 50. For example, if the shared data device is a laser printer or a PDA, the page is formatted in accordance with that shared data device's driver requirements (e.g., ASCII format). If the shared data device is a display device, the page of data is formatted in accordance with that display device's driver requirements (e.g., as pixels for an on-screen display).

The formatted page of data is stored (written) in buffer memory 34, as indicated in step 52. Storage of data in buffer memory 34 allows shared data decoder and formatter 32 to determine if another page of data is to be acquired, as indicated in step 54, regardless of whether the shared data device is ready to receive the data. Thus, buffer memory 34 has the capacity to store several pages of formatted data. In step 54, shared data decoder and formatter 32 determines if another page of data is to be acquired. This is determined, in the EPG example, by the size of the program guide. If the program guide contains multiple pages, each page of data is acquired until the total program guide is acquired. It is envisioned that a viewer may have the choice of printing a subset of the total program guide. In this instance, only those pages selected by the viewer are acquired. If another page of data is to be acquired at step 54, the page selection counter is incremented, as shown in step 56, to ensure that the next page is acquired. The pages of data stored in buffer memory 34 are transferred to the shared data device 8 via communications channel 16. As indicated in step 58, in the exemplary embodiment of the invention, the data is transferred in accordance with the communications channel protocol (e.g., RS-232).

After data has been transferred to a shared data device, the viewer may review the data. For example, if the shared data device is a printer and the data is a program guide, the viewer may review the printed program guide and subsequently view desired programs, program a VCR to record desired programs, or program the STB to create a favorite channels list. If the shared data device is a PDA, the viewer may review the program guide on the PDA and perform any of the above actions either manually or via the PDA. For example, the viewer may program the VCR 6 with the PDA using the PDA and its infrared port as a remote control device for the VCR 6.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A system for providing auxiliary data from a television receiver comprising:
   a terminal for applying a data stream to the television receiver, the data stream including a television signal and the auxiliary data;
   a controller internal to the television receiver which processes the data stream to extract the auxiliary data, to determine a type of shared data device to receive the auxiliary data and to format the auxiliary data in accordance with requirements of the determined type of shared data device;
   a plurality of shared data devices of different types coupled to the television receiver; and
   a communications channel for coupling the television receiver to the plurality of shared data devices to transfer the auxiliary data exclusive of the television signal from the controller to at least one of the plurality of shared data devices as determined by the controller.

2. A system according to claim 1, wherein the television receive is a set top box and the system further includes:
   a display device;
   an audio processor; and
   a video processor;
   wherein the controller extracts the television signal from the data stream, divides the data stream into separate audio and video components and provides the audio components to the audio processor and the video components to the video processor and, wherein the video processor provides processed video signals for display on the display device.

3. A system according to claim 2 further comprising a digital video tape recorder coupled to the television receiver.

4. A system according to claim 1, wherein the plurality of shared data devices include at least one of a printer, a digital video tape recorder and a personal digital assistant.

5. A system for processing auxiliary data sent with a digital television signal comprising:
   a television receiver for receiving and processing the digital television signal, to provide a processed television signal, to extract the auxiliary data from the digital television signal, to determine, from the auxiliary data, a type of shared data device to receive the auxiliary data, to format the auxiliary data in accordance with requirements of the determined type of shared data device, and to provide the auxiliary data signal exclusive of the processed television signal in accordance with a shared data device communications channel protocol;
   a plurality of shared data devices;
   a shared data device communications channel, that operates according to the shared data device communications channel protocol, for coupling the television receiver to at least one of the plurality of shared data devices according to the type or shared data device determined by the television receiver to receive the auxiliary data; and
   a display device for receiving and displaying the processed television signal.

6. A system according to claim 5, wherein the television receiver is a set top box.

7. A system according to claim 6 further comprising a digital video tape recorder coupled to the television receiver.

8. A system according to claim 5, wherein the at least one shared data device is selected from a group consisting of a further set top box, a primer, a digital video tape recorder, and a personal digital assistant.

9. A television receiver comprising:
   a front end interface for receiving a digital television signal, including auxiliary data and providing video and audio signals;
   a remote control receiver for receiving an initialization signal and providing a control signal;
   a video processing and decoding portion for receiving, processing, and decoding the video signal and providing an output video signal;
   an audio processing and decoding portion for receiving, processing, and decoding the audio signal and providing an output audio signal;
   a controller for receiving the video, audio and initialization signals, and auxiliary data and providing data signals and further control signals corresponding to the auxiliary data;
   an output interface portion coupled to a communication channel for receiving the output audio and video signals and for providing the output audio and video signals for presentation; and a shared data decoder and formatter coupled to the controller for receiving the data signals exclusive of the audio and video signals and, responsive to the initialization signal for determining, from the auxiliary data, a type of shared data device to receive the auxiliary data, for formatting the data signal according to the determined format and for providing the formatted data signal to a shared data device of the determined type in accordance with a communications channel protocol.

10. A television receiver in accordance with claim 9, wherein the television receiver is a set top box.

11. A television receiver in accordance with claim 9 further comprising at least one shared data device coupled to said shared data communications channel for receiving the formatted data signal in accordance with the communications channel protocol.

12. A television receiver in accordance with claim 9 further inducing a memory buffer coupled between the shared data decoder and formatter and the shared data communications channel.

13. A television receiver in accordance with claim 11 wherein the at least one shared data device is at least one of a printer, a digital video tape recorder, and a personal digital assistant.

14. A method for transferring auxiliary data from a television receiver to shared data device comprising the acts of:

a) receiving an initialization signal;

b) decoding the initialization signal to determine a type of shared data device to receive the auxiliary data;

c) acquiring a page of the auxiliary data;

d) formatting the page of auxiliary data in accordance with requirements of the type of shared data device; and e) transferring said page of data to said shared data device.

15. The method according to claim 14, wherein acts c) through e) are repeated for each page of auxiliary data to be transferred.

16. The method according to claim 14, wherein the act of transferring said page of auxiliary data to said shared data device further includes the act of transferring said page of data according to a protocol suitable for one of a printer, a digital video tape recorder, and a personal digital assistant.

* * * * *